United States Patent
Qu et al.

(10) Patent No.: US 10,887,962 B2
(45) Date of Patent: Jan. 5, 2021

(54) LAMP CONTROL DEVICE

(71) Applicant: SILICON WORKS CO., LTD., Daejeon-si (KR)

(72) Inventors: Wanyuan Qu, Daejeon (KR); Se Won Lee, Daejeon (KR); Byeong Ho Jeong, Daejeon (KR); Ju Pyo Hong, Daejeon (KR); Ju Hyun Lee, Daejeon (KR); Sung Hwan Kim, Yangsan-si (KR); Hai Feng Jin, Daejeon (KR); Joo Wan Ha, Bucheon-si (KR); Tae Young Yoo, Cheongju-si (KR)

(73) Assignee: Silicon Works Co., Ltd., Daejeon-si (KR)

( * ) Notice: Subject to any disclaimer, the term of this patent is extended or adjusted under 35 U.S.C. 154(b) by 590 days.

(21) Appl. No.: 15/541,213

(22) PCT Filed: Dec. 30, 2015

(86) PCT No.: PCT/KR2015/014477
§ 371 (c)(1),
(2) Date: Jun. 30, 2017

(87) PCT Pub. No.: WO2016/108615
PCT Pub. Date: Jul. 7, 2016

(65) Prior Publication Data
US 2017/0374712 A1  Dec. 28, 2017

(30) Foreign Application Priority Data

Dec. 30, 2014 (KR) .......... 10-2014-0193792
Dec. 30, 2014 (KR) .......... 10-2014-0193793

(51) Int. Cl.
*H05B 45/37* (2020.01)
*H05B 45/10* (2020.01)
(Continued)

(52) U.S. Cl.
CPC ............. *H05B 45/37* (2020.01); *B60Q 1/34* (2013.01); *B60Q 1/44* (2013.01); *H05B 45/10* (2020.01); *H05B 45/46* (2020.01); *H05B 45/50* (2020.01)

(58) Field of Classification Search
CPC ......... F21S 43/00; H05B 45/00; H05B 47/10; H05B 45/50; H05B 45/46; H05B 45/37;
(Continued)

(56) References Cited

U.S. PATENT DOCUMENTS

| 2013/0002161 A1* | 1/2013 | Xu ......................... H05B 45/10 315/200 R |
| 2013/0033191 A1* | 2/2013 | Choi ...................... H05B 45/44 315/224 |

FOREIGN PATENT DOCUMENTS

| CN | 102082507 A | 6/2011 |
| CN | 103533721 | 1/2014 |

(Continued)

OTHER PUBLICATIONS

International Search Report for International Application No. PCT/KR2015/014477, dated May 19, 2016.
(Continued)

*Primary Examiner* — Alexander H Taningco
*Assistant Examiner* — Amy X Yang
(74) *Attorney, Agent, or Firm* — Polsinelli PC (57) ABSTRACT

Disclosed is a lamp control device. The lamp control device may include: a lamp having an LED channel; a channel resistor corresponding to the LED channel; and a controller configured to boost a channel resistor voltage applied to the channel resistor, and retain a channel current of the LED channel as a target current, using the boosted channel resistor voltage.

7 Claims, 5 Drawing Sheets

(51) Int. Cl.
  *H05B 45/46*     (2020.01)
  *H05B 45/50*     (2020.01)
  *B60Q 1/34*      (2006.01)
  *B60Q 1/44*      (2006.01)

(58) Field of Classification Search
  CPC .. H05B 45/10; B60Q 1/44; B60Q 1/34; F21V 23/04
  USPC ........................................................ 315/187
  See application file for complete search history.

(56)             References Cited

FOREIGN PATENT DOCUMENTS

KR         10-0940042      2/2010
KR      10-2013-0015609    2/2013
KR      10-2013-0069319    6/2013
KR         20140107837 A   9/2014
KR         20140107839 A   9/2014

OTHER PUBLICATIONS

Written Opinion for International Application No. PCT/KR2015/014477 with English translations, dated May 19, 2016.

\* cited by examiner

| EN_SLCH | SLCH_HALF | LHDT | EN_SLCH | SL_FULL |
|---|---|---|---|---|
| 1 | 0 | X | 1 | 1 |
| 1 | 1 | 0 | 1 | 1 |
| 1 | 1 | 1 | 1 | 0 |
| 0 | X | X | 0 | 0 |

FIG. 9

LAMP CONTROL DEVICE

BACKGROUND

1. Technical Field

The present disclosure relates to a lamp control device, and more particularly, to a lamp control device capable of reducing a power loss and EMI (Electro Magnetic Interference).

2. Related Art

Recently, with the rapid development of high-brightness LEDs (Light Emitting Diode), a lamp having LEDs mounted therein has been developed. The lamp employing LEDs as a light source may be designed in various manners, and the number of LEDs used therein tends to increase.

With the increase in number of LED channels, the number of channel resistors connected to the LED channels is also increasing. The channel resistors may generate heat when a channel current flows therethrough, and the heat generated by the channel resistors may increase a power loss.

When the channel resistors are removed to reduce a power loss, noise may be introduced into a lamp control device. When the value of the channel resistor is reduced, a channel resistor voltage lowered by the channel resistor may be lowered to make it difficult to drive a target channel current, and the reduction in value of the channel resistor may have an influence on output voltage regulation.

Thus, there is an urgent demand for a technique capable of retaining a channel current at a target current while reducing a power loss caused by heat generation of channel resistors, in order to employ a plurality of LED channels in a lamp.

Furthermore, the lamp control device drives a plurality of LED channels through repeated switching operations for each of the LED channels. However, since the repeated switching operations for driving the LED channels accompany a rapid voltage change, the repeated switching operations may serve as a main factor to cause EMI (Electro Magnetic Interference). Therefore, there is an urgent demand for a technique capable of reducing EMI caused by repeated switching operations for LED channels.

SUMMARY

Various embodiments are directed to a lamp control device capable of reducing a power loss caused by heat generation of an LED channel.

Also, various embodiments are directed to a lamp control device capable of retaining a channel current as a target current while reducing the size of a channel resistor.

Also, various embodiments are directed to a lamp control device capable of adjusting the slope of a channel current by adjusting the slope of a channel reference voltage of an LED channel.

Also, various embodiments are directed to a lamp control device capable of reducing EMI by adjusting the slope of a channel current.

Also, various embodiments are directed to a lamp control device capable of varying the slope of a channel current according to a PWM (Pulse Width Modulation) dimming duty of an LED channel.

In an embodiment, a lamp control device may include: a lamp having an LED channel; a channel resistor corresponding to the LED channel; and a controller configured to boost a channel resistor voltage applied to the channel resistor, and retain a channel current of the LED channel as a target current, using the boosted channel resistor voltage.

In an embodiment, a lamp control device may include: a lamp having an LED channel; a channel driving circuit configured to compare a channel reference voltage and a comparison voltage, and control a channel current of the LED channel in response to the comparison result; and a booster circuit including a plurality of pumping capacitors, and configured to boost a channel resistor voltage applied to a channel resistor corresponding to the LED channel, and provide the boosted channel resistor voltage to the channel driving circuit.

In an embodiment, a lamp control device may include: a lamp having an LED channel; a channel driver configured to compare a channel reference voltage and a boosted channel resistor voltage, and output a driving signal corresponding to the comparison result; a channel resistor corresponding to the LED channel; a plurality of pumping capacitors; a plurality of first switches configured to perform switching to connect the plurality of pumping capacitors in parallel between the channel resistor and the ground; and a second switch configured to perform switching to connect the plurality of pumping capacitors in series between the channel resistor and the channel driver. The plurality of pumping capacitors may be charged with the channel resistor voltage of the channel resistor when connected in parallel by the first switches, and provide the boosted channel resistor voltage to the channel driver when connected in series by the second switch.

In an embodiment, a lamp control device may include: a lamp having an LED channel; a channel current control unit configured to generate a channel reference voltage that rises/falls with a slope at a point of time that the LED channel is enabled/disabled; and a channel driving circuit configured to control a channel current of the LED channel in response to the channel reference voltage.

In an embodiment, a lamp control device may include: a ramp voltage generator configured to generate a ramp voltage that has a rising slope at a point of time that an LED channel is enabled or has a falling slope at a point of time that the LED channel is disabled; a selection controller configured to provide a selection signal of which the logic state is decide in response to a comparison result between the ramp voltage and a reference voltage; a selector configured to select any one of the ramp voltage and a reference voltage as a channel reference voltage in response to the logic state of the selection signal; and a channel driving circuit configured to drive the LED channel such that the channel current rises or falls with a slope in response to the channel reference voltage.

In an embodiment, a lamp control device may include: a lamp having an LED channel; a ramp voltage generator including a ramp capacitor, and configured to charge the ramp capacitor at a point of time the LED channel is enabled, discharge the ramp capacitor at a point of time that the LED channel is disabled, and generate a ramp voltage with a rising/falling slope in response to the charging/discharging of the ramp capacitor; a selection controller configured to compare the ramp voltage and a reference voltage, and provide a selection signal of which the logic state is decided in response to the comparison result; a selector configured to select any one of the ramp voltage and the reference voltage as a channel reference voltage in response to the logic state of the selection signal; a channel driver configured to compare the channel reference voltage and a channel resistor voltage, and provide a driving signal corresponding to the comparison result; and a channel switch configured to perform switching in response to the driving signal such that a channel current rises/falls with a slope at the point of time that the LED channel is enabled/disabled.

According to the embodiments of the present invention, the lamp control device can reduce the value of the channel resistor in the LED channel, thereby reducing a power loss caused by heat generation the channel resistor.

Since the lamp control device boosts the channel resistor voltage lowered by the value of the channel resistor and drives the LED channel, the lamp control device can retain the channel current as the target current even though the channel resistor is designed to have a low value.

The lamp control device can reduce the slope of the channel current at the point of time that the LED channel is enabled/disabled, thereby reducing EMI which may be caused by switching operations of the channel switch.

Since the slope of the channel current is varied according to the PWM (Pulse Width Modulation) dimming duty of the LED channel, a flat section of the channel current can be secured even at a significantly small or large duty, which makes it possible to perform current control with precision.

DETAILED DESCRIPTION

Hereafter, embodiments of the present invention will be described in detail with reference to the accompanying drawings. The terms used in the present specification and claims are not limited to typical dictionary definitions, but must be interpreted into meanings and concepts which coincide with the technical idea of the present invention.

Embodiments described in the present specification and configurations illustrated in the drawings are preferred embodiments of the present invention, and do not represent the entire technical idea of the present invention. Thus, various equivalents and modifications capable of replacing the embodiments and configurations may be provided at the point of time that the present application is filed.

Various embodiments of the present invention disclose a lamp control device capable of reducing a power loss and EMI (Electro Magnetic Interference) which may occur while light emission of a lamp is controlled. For convenience of description, a lamp control device applied to a vehicle lamp will be exemplified.

Figure 1:
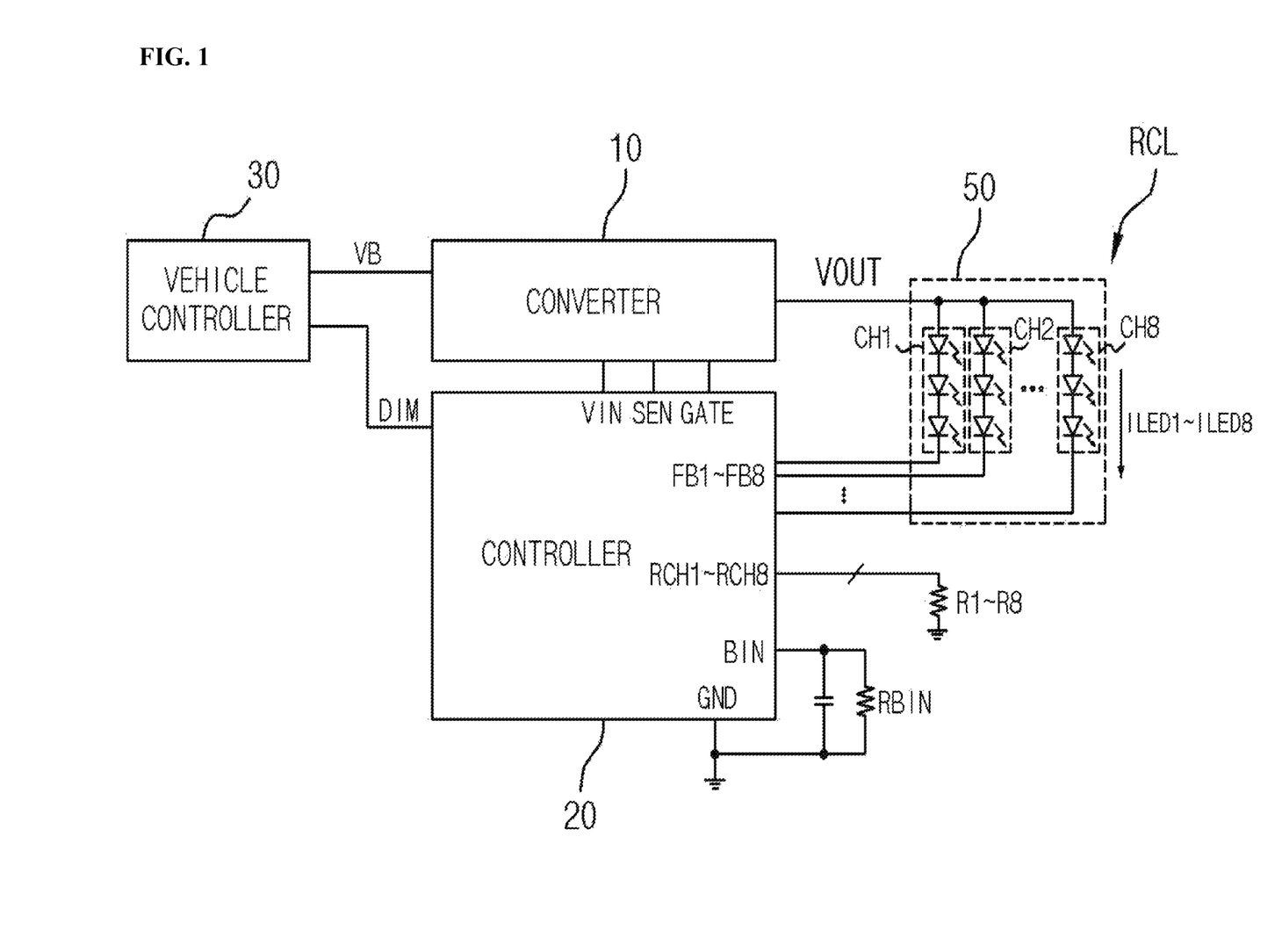
FIG. 1 is a diagram illustrating a lamp control device according to an embodiment of the present invention.

FIG. 1 is a diagram illustrating a lamp control device according to an embodiment of the present invention.

Referring to FIG. 1, the lamp control device includes a lamp RCL, a converter 10 and a controller 20.

The lamp RCL includes an LED module 50 having a plurality of LED channels. The plurality of LED channels in the LED module 50 may be arranged in parallel to each other. FIG. 1 illustrates that one controller 20 drives LEDs included in first to eighth channels CH1 to CH8 of the LED module 50.

A vehicle controller 30 supplies a battery voltage VB to the converter 10 in response to one or more of a direction signal, a sudden braking signal, a braking signal and a tail signal, and transmits a dim signal DIM to the controller 20 in response to the sudden braking signal or the braking signal.

The converter 10 generates an output voltage VOUT and internal voltage VIN using the battery voltage VB supplied from the vehicle controller 30, supplies the output voltage VOUT to the LED module 50, and supplies the internal voltage to the controller 20. For example, a buck converter may be used as the converter 10.

The controller 20 may be implemented with one semiconductor chip. When the internal voltage VIN is supplied from the converter 10, the controller 20 turns on/off the first to eighth channels CH1 to CH8 of the LED module 50 through a preset value in response to a logic state of the dim signal DIM.

The controller 20 has feedback voltage terminals FB1 to FB8 connected to the first to eighth channels CH1 to CH8, respectively, and channel resistor terminals RCH1 to RCH8 connected to channel resistors R1 to R8, respectively. The controller 20 may include a switching unit therein, and the switching unit may be configured to form or block current paths between the feedback voltage terminals FB1 to FB8 and the respective channel resistor terminals RCH1 to RCH8.

Figure 2:
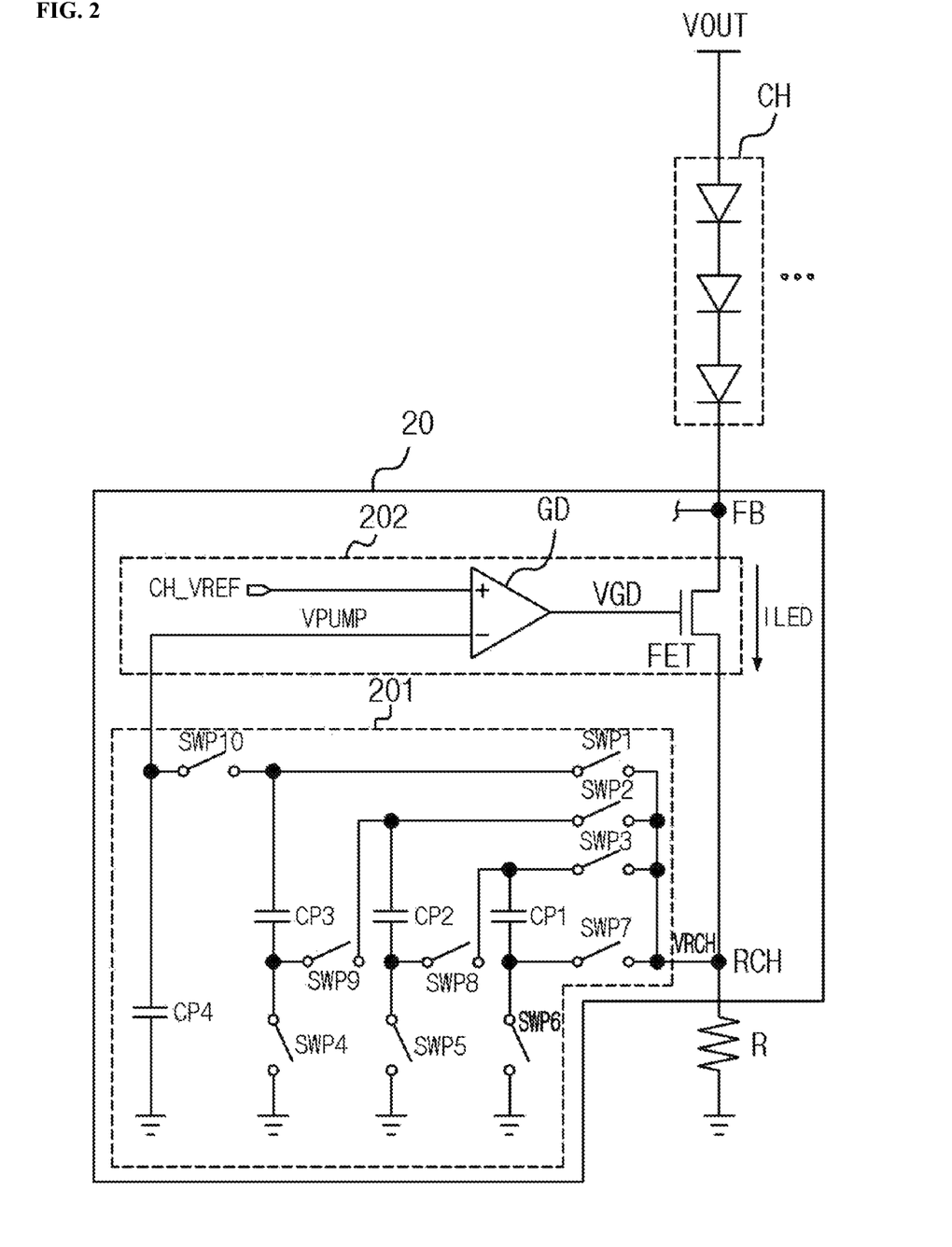
FIG. 2 is a diagram illustrating an embodiment for pumping a channel resistor voltage of FIG. 1.

Referring to FIG. 2, the configuration related to the switching unit will be described in detail. FIG. 2 illustrates a configuration of the controller 20, which corresponds to one LED channel CH and one channel resistor R. The switching unit includes a channel switch FET, and the channel switch FET forms a current path between the feedback voltage terminal FB and the channel resistor terminal RCH in response to a driving signal VGD of a channel driver GD.

The controller 20 may include a channel driving circuit 202, and the channel driving circuit 202 may include the channel switch FET and the channel driver GD.

The channel driver GD may include a comparator, compare a channel reference voltage CH_VREF applied to a positive terminal (+) thereof to a boosted channel resistor voltage VPUMP applied to a negative terminal (−) thereof, and provide the driving signal VGD corresponding to the comparison result to the gate of the channel switch FET. The channel reference voltage CH_VREF may be differently set for each of the LED channels, the boosted channel resistor voltage VPUMP may be obtained by boosting the channel resistor voltage VRCH, and the boosting of the channel resistor voltage VRCH may be performed by pumping.

The channel resistor R may be installed for each of the LED channels. The channel resistor R is needed to retain a channel current ILED of the LED channel CH as a target current. However, when the channel current ILED flows through the channel resistor R, heat may be generated to cause a power loss.

The various embodiments of the present invention provide a lamp control device which is capable of reducing the resistance value of the channel resistor R, thereby reducing a power loss caused by heat while retaining the channel current ILED of the LED channel as the target current.

In order to retain the channel current ILED of the LED channel as the target current while reducing the resistance value of the channel resistor R, the lowered channel resistor voltage VRCH of the channel resistor terminal RCH needs to be compensated for.

For this operation, the lamp control device may lower the resistance value of the channel resistor R, boost the lowered channel resistor voltage VRCH through pumping, and provide the boosted channel resistor voltage VRCH to the channel driver GD, thereby retaining the channel current ILED of the LED channel CH as the target current.

As illustrated in FIG. 2, the boosting of the channel resistor voltage VRCH may be performed through a booster circuit 201. The booster circuit 201 boosts the channel resistor voltage VRCH of the channel resistor terminal RCH through pumping, and provides the boosted channel resistor voltage VPUMP to the channel driver GD.

Referring to FIG. 2, the booster circuit 201 includes a plurality of pumping capacitors CP1 to CP3, a plurality of first switches SWP1 to SWP6 and a plurality of second switches SWP7 to SWP10.

The pumping capacitors CP1 to CP3 may be selectively connected in parallel to the channel resistor R through switching operations of the first switches SWP1 to SWP6, and selectively connected in series to the channel resistor R through switching operations of the second switches SWP7 to SWP10. When the pumping capacitors CP1 to CP3 are connected in parallel by turn-on of the first switches SWP1 to SWP6, the pumping capacitors CP1 to CP3 are charged by the channel current ILED. At this time, the second switches SW7 to SW10 maintain the turn-off state. Furthermore, when the pumping capacitors CP1 to CP3 are connected in series by turn-on of the second switches SWP7 to SWP10, the pumping capacitors CP1 to CP3 provide the boosted channel resistor voltage VPUMP to the channel driver GD. At this time, the first switches SW1 to SW6 maintain the turn-off state. When the charge capacities of the pumping capacitors CP1 to CP3 are equal to the channel resistor voltage, the boosted channel resistor voltage VPUMP may be provided as a voltage boosted to a level four times higher than the channel resistor voltage VRCH before boosting.

For the above-described operation, one terminals of the pumping capacitors CP1 to CP3 are commonly connected to the channel resistor R through the respective switches SWP1 to SWP3, and the other terminals thereof are connected to the ground through the switches SWP4 to SWP6. The switch SW7 is configured between the channel resistor R and the other terminal of the pumping capacitor CP1, the switch SW8 is configured between the other terminal of the pumping capacitor CP2 and the one terminal of the pumping capacitor CP1, the switch SW9 is configured between the other terminal of the pumping capacitor CP3 and the one terminal of the pumping capacitor CP2, and the switch SW10 is configured between the one terminal of the pumping capacitor CP3 and the negative terminal (−) of the channel driver GD. The first and second switches SWP1 to SWP10 may be configured to switch at a higher frequency than the channel switch FET.

As such, the booster circuit 201 charges the plurality of pumping capacitors CP1 to CP3 by connecting the plurality of pumping capacitors CP1 to CP3 and the channel resistor R in parallel to each other. Furthermore, the booster circuit 201 charges the plurality of pumping capacitors CP1 to CP3 by connecting the plurality of pumping capacitors CP1 to CP3 and the channel resistor R in series to each other, and provides the sum of the channel resistor voltage VRCH and the voltages of the charged pumping capacitors CP1 to CP3 as the boosted channel voltage VPUMP.

The booster circuit 201 further includes a stabilization capacitor CP4 connected in parallel to the second switch SWP10. The stabilization capacitor CP4 may stably provide the boosted channel resistor voltage VPUMP to the channel driver GD.

Since the lamp control device according to the embodiment of the present invention can reduce the resistance value of the channel resistor R of each LED channel, the lamp control device can reduce a power loss caused by the heat generation of the channel resistor R.

Furthermore, since the lamp control device according to the embodiment of the present invention pumps the lowered channel resistor voltage VRCH to the target voltage while lowering the resistance value of the channel resistor, the lamp control device can retain the channel current of the LED channel at the target current.

Figure 3:
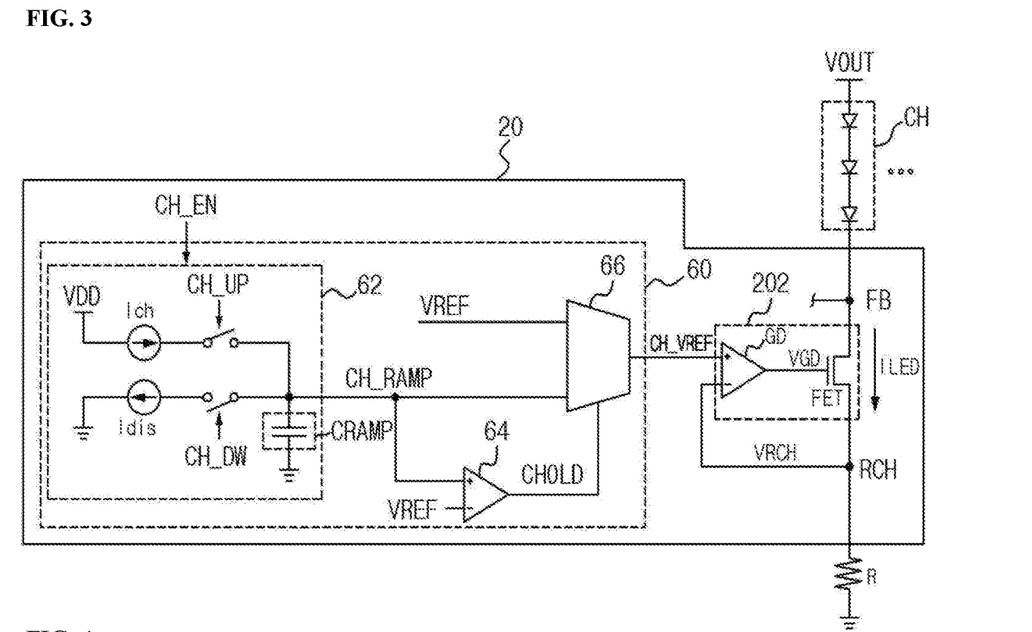
FIG. 3 is a diagram illustrating an embodiment for driving an LED channel of FIG. 1.

The lamp control device according to the embodiment of the present invention needs to control the slope of the channel current. For this operation, an embodiment for controlling a channel reference voltage may be exemplified as illustrated in FIG. 3. FIG. 3 is a diagram illustrating an embodiment for driving an LED channel of FIG. 1.

Referring to FIG. 3, the present embodiment includes the channel driving circuit 202 and a channel current control unit 60. The channel driving circuit 202 may include the channel switch FET and the channel driver GD.

The channel switch FET forms or block a current path between the feedback voltage terminal FB and the channel resistor terminal RCH according to the driving signal VGD. When the current path is formed, the LED channel CH emits light using the channel current ILED. FIG. 2 illustrates only one LED channel CH and one channel switch FET for convenience of description, but the channel switch FET may be installed for each of the LED channels CH.

The channel driver GD compares the channel reference voltage CH_VREF and the channel resistor voltage VRCH, generates the driving signal VDG corresponding to the comparison result, and provides the driving signal VGD to the channel switch FET. The channel resistor voltage VRCH may include a voltage applied to the channel resistor R.

The channel reference voltage CH_VREF and the channel resistor voltage VRCH may be used for dimming control of the LED channel CH. Therefore, the magnitude of the channel current ILED may be decided according to the channel reference voltage CH_VEEF.

The lamp control device according to the present embodiment can control the channel reference voltage CH_VREF to rise or fall with a slope at the point of time that the LED channel is enabled or disabled, and adjust the slope of the channel current ILED by controlling the slope of the channel reference voltage CH_VREF. The lamp control device can adjust the slope of the channel current ILED in order to reduce EMI which may be caused by repeated switching operations of the channel switch FET. For this operation, the lamp control device may include the channel current control unit 60 installed for each channel CH and configured to generate the channel reference voltage CH_VREF that rises with a slope when a channel enable signal CH_EN rises, and falls with a slope when the channel enable signal CH_EN falls.

The channel current control unit 60 to generate the channel reference voltage CH_VREF may be configured as follows.

Referring to FIG. 3, the channel current control unit 60 includes a ramp voltage generator 62, a selector 66 and a selection controller 64.

The ramp voltage generator 62 raises a ramp voltage CH_RAMP when the channel enable signal CH_EN rises or lowers the lamp voltage CH_RAMP when the channel enable signal CH_EN falls, and provides the ramp voltage CH_RAMP to the selector 66. At this time, the ramp voltage CH_RAMP has a slope while rising or falling. The ramp voltage generator 62 includes a ramp capacitor CRAMP, a charging current unit Ich and a discharging current unit Idis.

The ramp capacitor CRAM may include one capacitor or a plurality of capacitors CR1 to CR3 (refer to FIG. 5) of which the number is set in response to the enable time (duty cycle) of the LED channel. The detailed configuration of the ramp capacitor CRMP will be described later with reference to FIG. 5.

Figure 4:
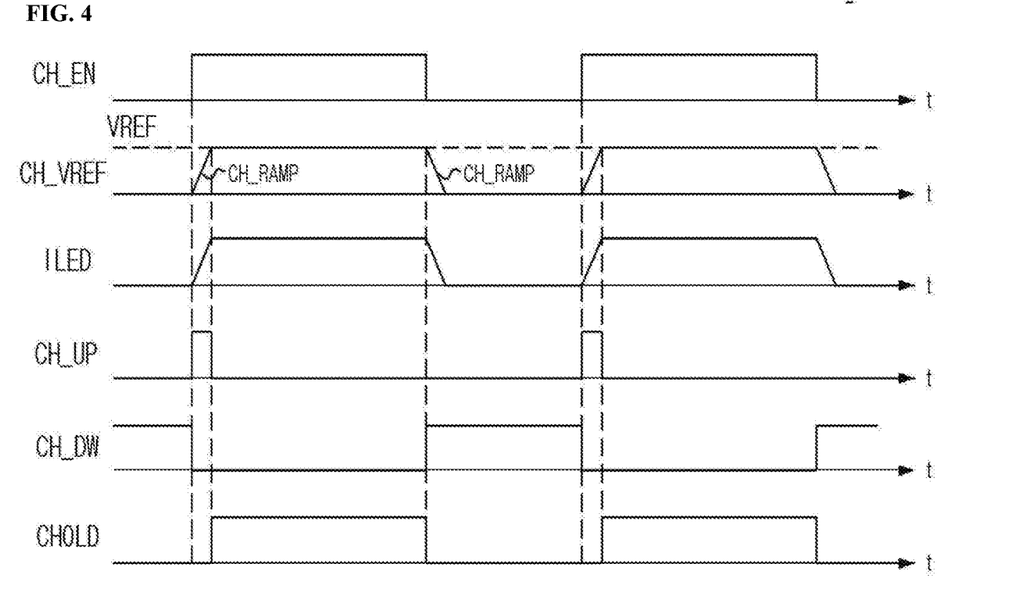
FIG. 4 is a timing diagram for describing an operation process of FIG. 3.

The charging current unit Ich may charge the ramp capacitor CRAMP in response to a first lamp control signal CH_UP, and the ramp voltage CH_RAMP has a slope corresponding to the charge state of the ramp capacitor CRAMP. Referring to FIG. 4, the first ramp control signal CH_UP may be defined as a signal which is activated in synchronization with a rising edge of the channel enable signal CH_EN.

The discharging current unit Idis may discharge the ramp capacitor CRAMP in response to a second ramp control signal CH_DW, and the ramp voltage CH_RAMP has a slope corresponding to the discharge state of the ramp capacitor CRAMP. Referring to FIG. 4, the second ramp control signal CH_DW may be defined as a signal which is enabled when the channel enable signal CH_EN is disabled.

The ramp voltage generator 62 may adjust the slope of the ramp voltage CH_RAMP by varying the current magnitudes of the charging current unit Ich and the discharging current unit Idis, or adjust the slope of the ramp voltage CH_RAMP by varying the size of the ramp capacitor.

The selector 66 selects any one of the ramp voltage CH_RAMP and a reference voltage VREF as the channel reference voltage CH_VREF in response to a selection signal CHOLD, and provides the selected voltage to the channel driver GD. The ramp voltage CH_RAMP may have a slope that rises or falls in response to the charge or discharge state of the ramp capacitor CRAMP, and the reference voltage VREF for dimming control of the LED channel CH may be differently set for each of the LED channels CH. The logic state of the selection signal CHOLD is set to a high or low level according to a magnitude comparison result between the ramp voltage CH_RAMP and the reference voltage VREF.

The selection controller 64 compares the ramp voltage CH_RAMP and the reference voltage VREF, generates the selection signal CHOLD of which the logic state is set according to the comparison result, and provides the selection signal CHOLD to the selector 66. For example, the selection controller 64 may include a controller. In FIG. 3, the selection controller 64 outputs the selection signal CHOLD at a low level when the ramp voltage CH_RAMP is lower than the reference voltage VREF, and outputs the selection signal CHOLD at a high level when the ramp voltage CH_RAMP is higher than the reference voltage VREF. However, the present embodiment is not limited thereto. Furthermore, the present embodiment may be based on the supposition that an ideal comparator of which the offset voltage is offset is employed in the selection controller 64.

The operation of the channel current control unit 60 having the above-described configuration will be described as follows.

Referring to FIG. 4, when the channel enable signal CH_EN corresponding to the LED channel CH is enabled, the first ramp control signal CH_UP is enabled in synchronization with a rising edge of the channel enable signal CH_EN.

When the first ramp control signal CH_UP is enabled, the ramp capacitor CRAMP is charged by the charging current unit Ich, and the ramp voltage CH_RAMP starts to rise with a slope, with the ramp capacitor CRAMP charged.

The selection controller 64 compares the magnitudes of the reference voltage VREF and the ramp voltage CH_RAMP which starts to rise with a slope, and provides the low-level selection signal CHOLD to the selector 66 when the ramp voltage CH_RAMP is lower than the reference voltage VREF.

The selector 66 selects the ramp voltage CH_RAMP in response to the low-level selection signal CHOLD, and provides the selected voltage as the channel reference voltage CH_VREF to the channel driver GD. At this time, the channel reference voltage CH_VREF rises with a slope.

The channel driver GD compares the channel reference voltage CH_VREF and the channel resistor voltage VRCH, and provides the driving signal VGD corresponding to the comparison result to the channel switch FET. The channel switch FET gradually increases the amount of the channel current ILED in response to the driving signal VGD corresponding to the channel reference voltage CH_VREF that rises with a rising slope. That is, the channel current ILED gradually rises with a slope, according to the channel reference voltage CH_VREF that rises with a slope.

When the ramp voltage CH_RAMP is raised to the reference voltage VREF by the charging of the ramp capacitor CRAMP, the selection controller 64 provides the high-level selection signal CHOLD to the selector 66.

The selector 66 selects the reference voltage VREF in response to the high-level selection signal CHOLD, and provides the selected reference voltage VREF as the channel reference voltage CH_VREF to the channel driver GD. Then, the channel current ILED has a flat section based on the channel reference voltage CH_VREF having a flat section corresponding to the level of the reference voltage VREF. The channel current ILED is flatly retained while the channel enable signal CH_EN is enabled.

Then, when the channel enable signal CH_EN is disabled, the second ramp control signal CH_DW is enabled in synchronization with a falling edge of the channel enable signal CH_EN.

When the second ramp control signal CH_DW is enabled, the ramp capacitor CRAMP is discharged by the discharging current unit Idis, and the ramp voltage CH_RAMP starts to fall with a slope, with the ramp capacitor CRAMP discharged.

The selection controller 64 compares the magnitudes of the reference voltage VREF and the ramp voltage CH_RAMP starting to fall with a slope, and provides the low-level selection signal CHOLD to the selector 66 when the ramp voltage CH_RAMP falls below the reference voltage VREF.

The selector 66 selects the ramp voltage CH_RAMP as the channel reference voltage CH_VREF in response to the low-level selection signal CHOLD, and provides the selected voltage to the channel driver GD. At this time, the slope of the channel reference voltage CH_VREF is decided by the falling ramp voltage CH_RAMP.

The channel driver GD compares the channel reference voltage CH_VREF and the channel resistor voltage VRCH, and provides the driving signal VDG corresponding to the comparison result to the channel switch FET. The channel switch FET gradually decreases the amount of the channel current ILED in response to the driving signal VGD corresponding to the channel reference voltage CH_VREF with a falling slope. That is, the channel current ILED gradually falls with a slope corresponding to the falling slope of the channel reference voltage CH_VREF.

As such, the lamp control device according to the present embodiment can control the channel switch FET corresponding to the LED channel CH such that the channel current ILED rises or falls with a slope at a point of time that the channel switch FET is turned on or off. Thus, the lamp control device can reduce EMI which may be caused by repeated switching operations of the channel switch FET.

The LED channels CH of the lamp RCL may have different duties. The controller 20 of FIG. 1 may recognize a broken LED channel by monitoring the voltage of the feedback voltage terminal FB of the LED channel CH. For example, when it is determined that a short occurred in a specific LED channel, the controller 20 may set the duty of the corresponding LED channel to a considerably small value, in order to minimize the influence of the LED channel.

When the duty of the LED channel is set to a considerably small or large value, a flat section for adjusting the slope of the channel current may not be secured. In this case, the channel current control of the LED channel may not be accurately performed.

Therefore, the lamp control device according to the present embodiment can secure a flat section of the channel current ILED by varying the slope of the channel current ILED according to the PWM (Pulse Width Modulation) dimming duty of an LED channel. For this operation, the ramp capacitor CRAMP may be varied according to the duty of the LED channel.

Figure 5:
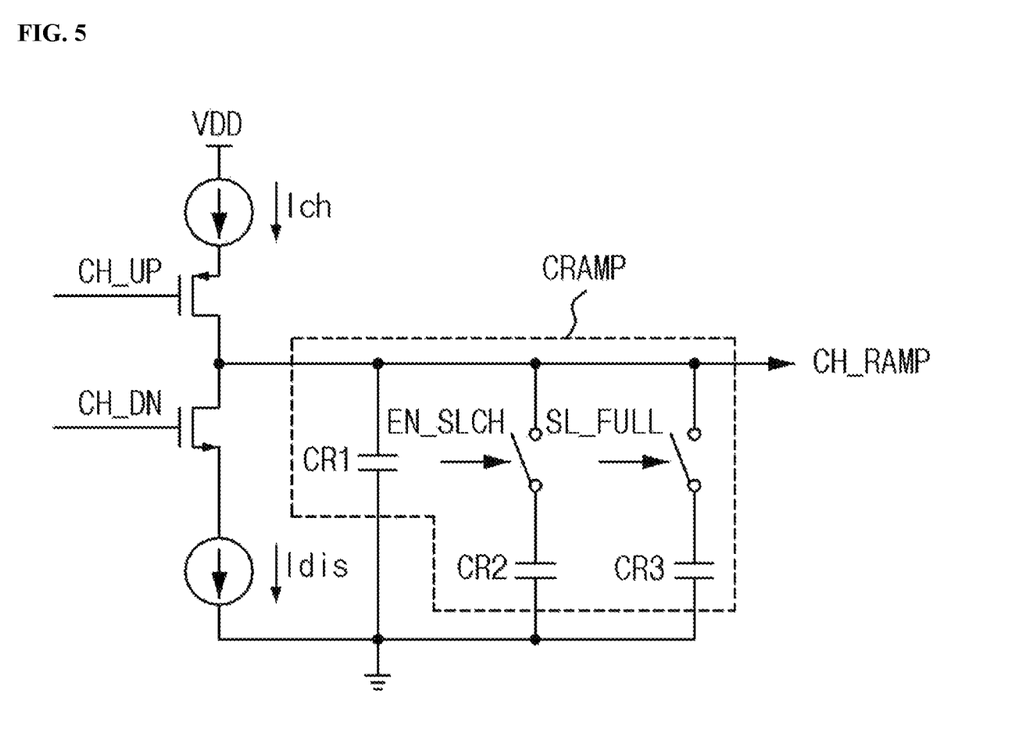
FIG. 5 is a circuit diagram for describing a ramp capacitor of FIG. 3.

FIG. 5 is a circuit diagram for describing the ramp capacitor CRAMP of FIG. 3.

Referring to FIG. 5, the ramp capacitor CRAMP includes a plurality of capacitors CR1 to CR3. The number of capacitors included in the ramp capacitor CRAMP may be set according to first and second switching control signals EN_SLCH and SL_FULL. The first and second switching control signals EN_SLCH and SL_FULL may be used to vary the slope of the ramp voltage CH_RAMP.

Figure 6:
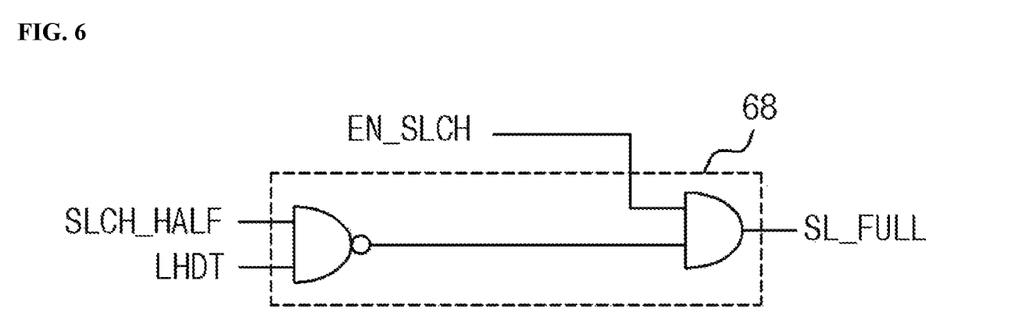
FIG. 6 is a circuit diagram for describing an embodiment for generating a switching control signal of FIG. 5.

As illustrated in FIG. 6, the second switching control signal SL_FULL is generated by a switching signal generator 68. The switching signal generator 68 provides the second switching control signal SL_FULL to the capacitor CR3 in response to a duty signal LHDT and a third switching control signal SLCH_HALF. The duty signal LHDT may be enabled when the duty of the LED channel is significantly increased or decreased. For example, the duty signal LHDT may be enabled when the duty of the LED channel is set to a reference range or less or set to more than the reference range.

Figure 7:
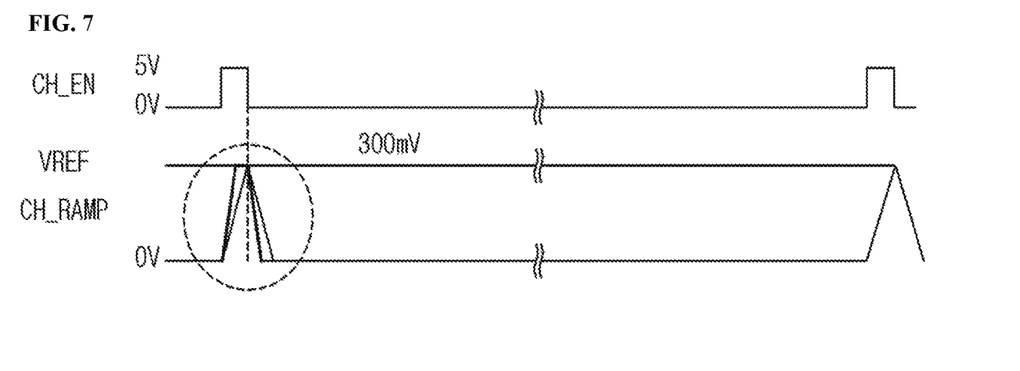
FIG. 7 is a diagram for describing variations in slope of a channel current according to the duty of an LED channel.
Figure 8:
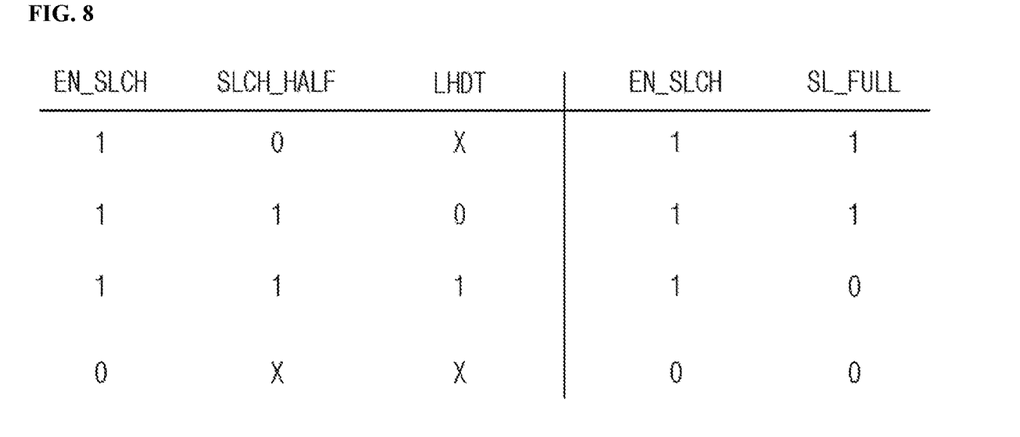
FIG. 8 is a truth table for describing the operation of FIG. 6.
Figure 9:
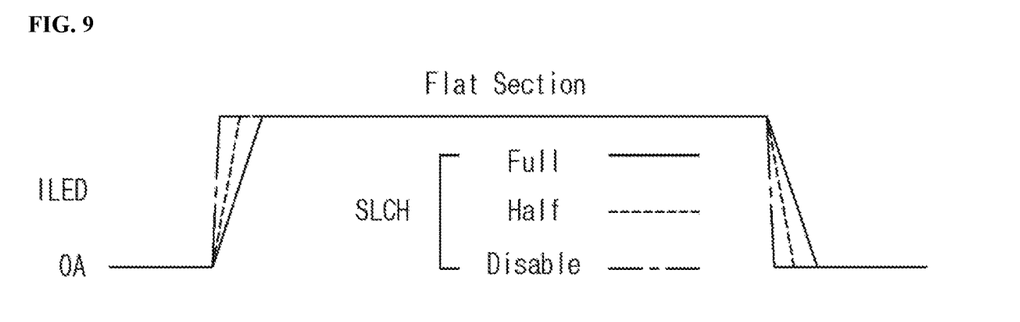
FIG. 9 is a diagram for describing the slope of the channel current varied by the operation of FIG. 6.

FIG. 7 is a diagram for describing a slope that is varied depending on the duty of an LED channel, FIG. 8 is a truth table for describing the operation of FIG. 6, and FIG. 9 is a diagram for describing the slope of the channel current varied by the operation of FIG. 6.

Referring to FIGS. 7 to 9, when the first and second switching control signals EN_SLCH and SL_FULL are all enabled, the channel current ILED is smoothly raised or lowered by the ramp voltage CH_RAMP with a smoothly rising or falling slope through the charging or discharging of the capacitors CR1 to CR3. When the first and second switching control signals EN_SLCH and SL_FULL are all disabled, the channel current ILED is rapidly raised or lowered by the ramp voltage CH_RAMP with a rapidly rising or falling slope through the charging or discharging of the capacitor CR1. When the first switching control signal EN_SLCH is enabled and the second switching control signal SL_FULL is disabled, the channel current ILED is raised or lowered with a half slope by the charging or discharging of the capacitors CR1 and CR2 as illustrated in FIG. 9. The half slope may be defined as an intermediate value between the maximum slope and the minimum slope which are set by the charging and discharging of the capacitors CR1 to CR3.

The lamp control device according to the present embodiment may adjust the rising or falling slope of the ramp voltage CH_RAMP by varying the current magnitudes of the charging current unit Ich and the discharging current unit Idis. For example, when the duty of the LED channel is set to a considerably small value, the lamp control device may raise the charge/discharge speed of the ramp capacitor CRAM by increasing the current magnitudes of the charging current unit Ich and the discharging current unit Idis, in order to adjust the slope of the ramp voltage CH_RAMP.

As such, the lamp control device can adjust the slope of the ramp voltage CH_RAMP by varying the current magnitudes of the charging current unit Ich and the discharging current unit Idis or the size of the ramp capacitor, thereby securing a flat section of the channel current ILED.

As described above, the lamp control device according to the embodiment of the present invention can gradually raise or lower the channel current ILED by adjusting the slope of the channel reference voltage CH_VREF at a point of time that the LED channel is enabled or disabled. Thus, the lamp control device can reduce EMI which may be caused when the channel switch FET is switched.

Furthermore, the lamp control device can secure a flat section of the channel current ILED by varying the slope of the channel current ILED according to the PWM dimming duty of the LED channel, thereby performing current control with precision.

While various embodiments have been described above, it will be understood to those skilled in the art that the embodiments described are by way of example only. Accordingly, the disclosure described herein should not be limited based on the described embodiments.

What is claimed is:
1. A lamp control device comprising:
a lamp having an LED channel;
a channel resistor corresponding to the LED channel; and
a controller configured to boost a channel resistor voltage applied to the channel resistor, and retain a channel current of the LED channel as a target current, using the boosted channel resistor voltage,
wherein the controller comprises:
a channel driving circuit configured to compare a channel reference voltage and the boosted channel resistor voltage, and control the channel current of the LED channel according to the comparison result; and
a booster circuit configured to boost the channel resistor voltage by using a plurality of pumping capacitors connected in parallel or series to the channel resistor, and provide the boosted channel resistor voltage to the channel driving circuit, the plurality of pumping capacitors are charged with the channel resistor voltage when connected in parallel or provide the boosted channel resistor voltage to the channel driving circuit when connected in series.

2. The lamp control device of claim 1, wherein the booster circuit boosts the channel resistor voltage through pumping.

3. The lamp control device of claim 1, wherein the booster circuit comprises:

the plurality of pumping capacitors;

a plurality of first switches configured to perform switching to connect the plurality of pumping capacitors in parallel to the channel resistor; and a plurality of second switches configured to perform switching to connect the plurality of pumping capacitors in series between the channel resistor and a channel driver of the channel driving circuit, wherein when the plurality of first switches are turned on, the plurality of second switches are turned off, and when the plurality of second switches are turned on, the plurality of first switches are turned off.

4. The lamp control device of claim 3, wherein the booster circuit further comprises a stabilization capacitor between the plurality of pumping capacitors and the channel driver of the channel driving circuit.

5. A lamp control device comprising:

a lamp having an LED channel;

a channel driver configured to compare a channel reference voltage and a boosted channel resistor voltage, and output a driving signal corresponding to the comparison result;

a channel resistor corresponding to the LED channel;

a plurality of pumping capacitors;

a plurality of first switches configured to perform switching to connect the plurality of pumping capacitors in parallel to the channel resistor; and a second switch configured to perform switching to connect the plurality of pumping capacitors in series between the channel resistor and the channel driver, wherein the plurality of pumping capacitors are charged with the channel resistor voltage of the channel resistor when connected in parallel by the first switches, and provide the boosted channel resistor voltage to the channel driver when connected in series by the second switch.

6. The lamp control device of claim 5, wherein the number of the pumping capacitors is set according to the value of the channel resistor.

7. The lamp control device of claim 5, further comprising a channel switch configured to control a channel current of the LED channel in response to the driving signal, wherein the first and second switches have a higher switching frequency than the channel switch.

\* \* \* \* \*